No. 611,360. Patented Sept. 27, 1898.
J. R. FORDYCE.
APPARATUS FOR CONVEYING LINT COTTON FROM GINS.
(Application filed Jan. 27, 1897.)
(No Model.) 2 Sheets—Sheet 2.
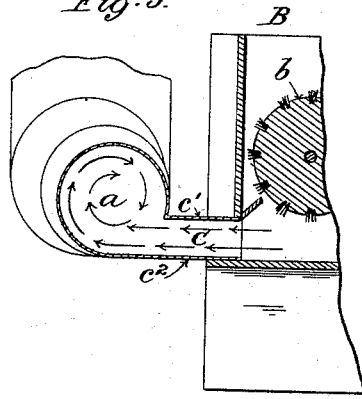
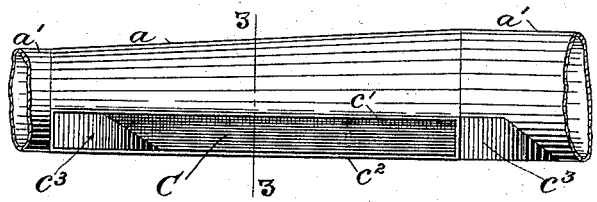
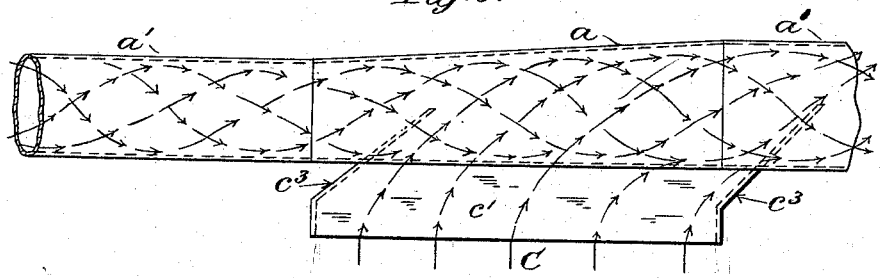
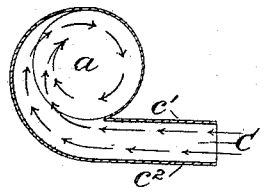
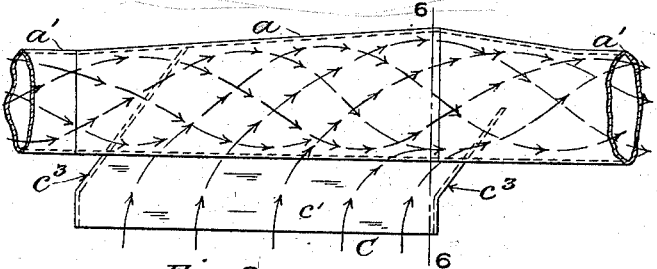
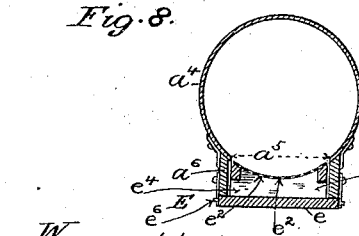
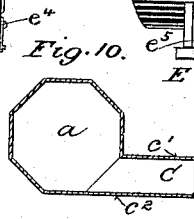
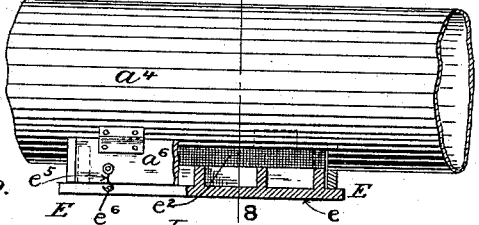
WITNESSES
Edward H. Furrell
Charles R. Greene
INVENTOR
John R. Fordyce
by Benj. S. Rly
Atty.

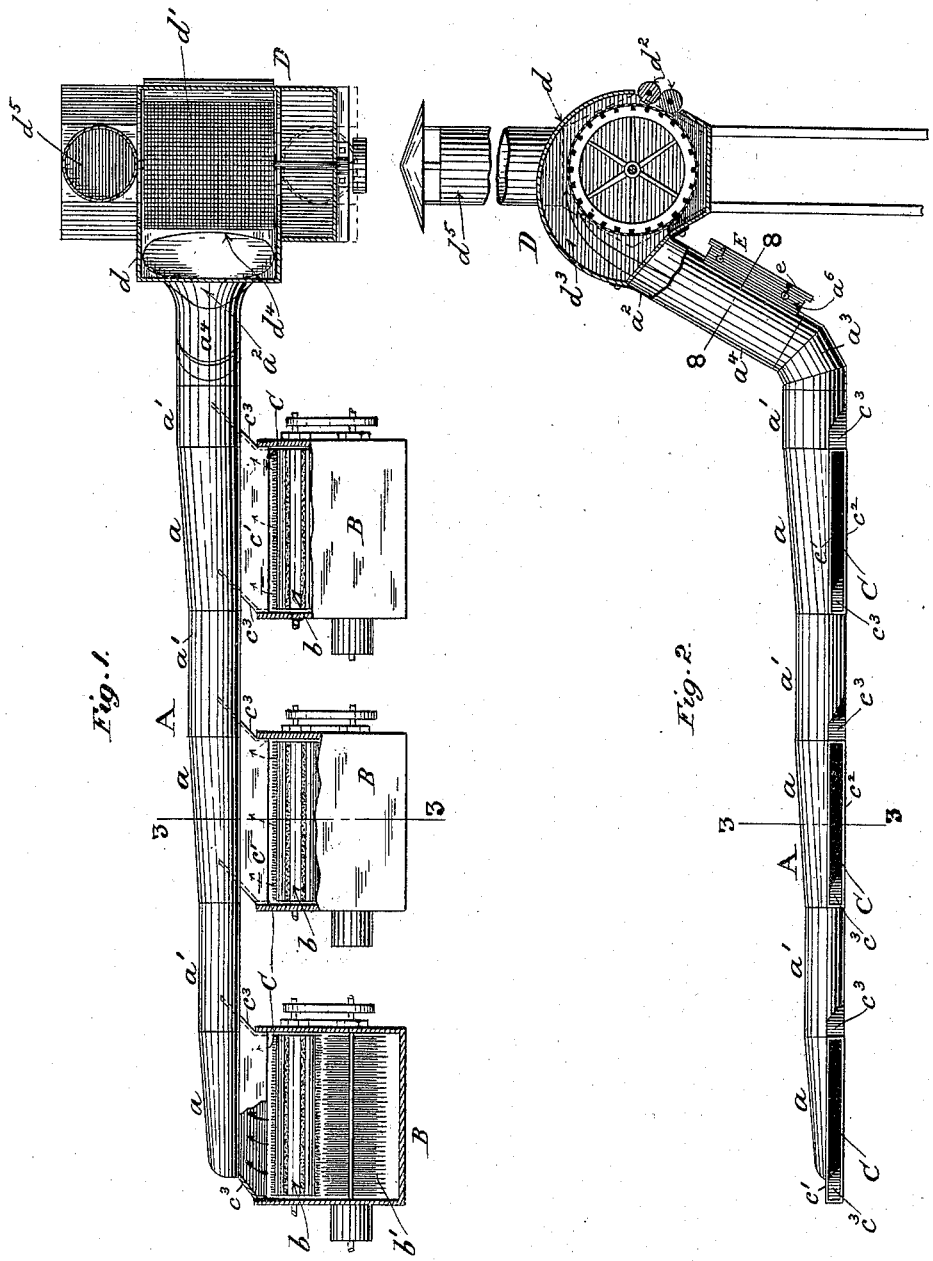

UNITED STATES PATENT OFFICE.

JOHN R. FORDYCE, OF ST. LOUIS, MISSOURI, ASSIGNOR TO THE THOMAS MANUFACTURING COMPANY, OF LITTLE ROCK, ARKANSAS.

APPARATUS FOR CONVEYING LINT-COTTON FROM GINS.

SPECIFICATION forming part of Letters Patent No. 611,360, dated September 27, 1898.

Application filed January 27, 1897. Serial No. 620,900. (No model.)

*To all whom it may concern:*

Be it known that I, JOHN R. FORDYCE, a citizen of the United States, residing at St. Louis, in the State of Missouri, have made certain new and useful Improvements in Apparatus for Conveying Lint-Cotton from Gins or Analogous Machines to Condensers, of which the following is a specification.

My invention relates to pneumatic apparatus for conveying lint-cotton to condensers, and is chiefly designed for use where two or more gins or analogous machines discharge into a common flue, by which the lint from all of said machines is delivered to a condenser; and the chief objects of my improvement are, first, the prevention of the creation of a back air-pressure in cotton-flues and machines discharging into them; second, to provide improved means for cleaning lint-cotton in flues leading to condensers; third, to provide a flue which can be caused to make a short bend at any point between inlets in its length without materially affecting its operation; fourth, to provide a common flue along which gins or analogous machines discharging into it can be spaced to suit the convenience of the user, and, fifth, to provide means for causing a bat of substantially uniform thickness to be formed by condensers receiving lint from two or more gins or analogous machines. I attain these objects by means illustrated in the accompanying drawings, in which—

Figure 1 is a plan view of the preferred form of the entire apparatus. Fig. 2 is in part a side elevation of the apparatus as it appears after the removal of the gins shown in Fig. 1 and in part a vertical transverse section of the condenser. Fig. 3 is a transverse section on line 3 3, Figs. 1, 2, and 4, with a part of the gin shown in Fig. 1 broken away. Fig. 4 is a detailed side elevation of a section of the common flue, showing an inlet in cross-section. Fig. 5 is a diagrammatic plan view of a section of the common flue and an inlet for the admission of a current of lint-bearing air, illustrating the course taken by the admitted currents of air after entering the common flue. Fig. 6 is a cross-section of a modification on line 6 6, Fig. 7. Fig. 7 is a detailed plan view of said modification on a reduced scale. Fig. 8 is a transverse section on line 8 8, Figs. 2 and 9. Fig. 9 is a view on an enlarged scale, partly in side elevation and partly in cross-section, of a detail; and Fig. 10 is a transverse section of a modification on a reduced scale.

Similar letters refer to similar parts throughout the several views.

A represents a flue for conveying lint-cotton from a series of gins or analogous machines to a condenser. In its preferred form its body is substantially curved in internal cross-section, and I have obtained my best results by making it round. It is preferably composed of sections or parts $a$ and $a'$ and a mouth $a^2$.

The inlets hereinafter described preferably open into the sections $a$, and the flue preferably includes one section $a$ for each machine discharging into it. The rear end of the flue is preferably closed and the rearmost section is preferably a section $a$. From the rearmost section $a$ forward the flue preferably enlarges at each section $a$ enough to enable the flue to accommodate the air and lint received through the inlet discharging into such section, as well as the air and lint received by the flue through inlets located farther back. The desired increase in size is preferably, not necessarily, secured by giving each of said sections $a$ the form of an imperfect truncated cone, substantially as represented in Figs. 1, 2, 3, 4, and 5, and arranging such sections with their large ends foremost. The enlargement is preferably toward the rear side opposite the gins and upward, so as to enable the inlets to be arranged at the same level throughout and the gins or analogous machines discharging into the flue to be kept in line.

The opening in the rear end of each section $a$ in advance of the rearmost one preferably has the same inside cross-sectional area as the inside cross-sectional area of the front end of the section $a$ next behind it, and the front end of each of said sections $a$ to the rear of the one nearest the mouth of the flue is preferably connected with the section $a$ next in front of it by a section $a'$ of substantially the same internal cross-sectional area throughout its length as that of the openings in the abutting ends of the sections thereby connected. Common flue systems are not usually built to order, and the use of the sections $a'$ enables the purchaser of such a system to readily change the spacing of the inlets hereinafter described by changing the length of one or more of the sections $a'$ of the flue or, where the sections $a$ are long enough, by omitting, in extreme cases, an intervening section $a'$ entirely. In my flue system such changes do not materially affect the operation of the flue, whereas a common flue, which increases in cross-sectional area continuously from end to end, has to be built, whatever its form in cross-section may be, with a view to a predetermined spacing of the inlets, and any material departure from that spacing will cause the flue to work badly.

As I have stated, the sections $a$ are preferably made in the form of imperfect truncated cones; but, as I have also stated, this is not essential, and Fig. 7 illustrates a modification in which the section $a$ shown after enlarging from rear to front for a part of its length is then contracted. This form is substantially the same as the other, however, the relative cross-sectional areas of the ends being substantially the same as in the preferred form and the contraction being rendered desirable by an enlargement not due to the necessity for additional capacity in the flue, but adopted chiefly for the purpose of giving the section $a$ what may be termed a "spiral" form, which, though theoretically the best, does not appear in practice any better than the preferred form referred to, while it is much more difficult to build than said preferred form.

A flue of the described form may be caused to make sharp turns between inlets without materially affecting its operation.

B B B, Figs. 1 and 3, represent cotton-gins of ordinary construction. The gins shown are each provided with a brush-cylinder $b$, which not only removes the lint from the saws $b$, but creates a current of air by which the lint is blown into the flue $a$.

My flue system is adapted for use in connection with air-blast gins, linters, and delinters as well as brush-gins.

C C C, Figs. 1, 2, 3, 4, 5, 6, and 7, represent passages or inlets for introducing currents of lint-bearing air into the flue A. The top $c'$ and bottom $c^2$ of each are preferably parallel, and the sides $c^3$ thereof preferably incline forward, as shown. The outer end of each is shown connecting with a gin B, and each is shown discharging into an enlarging section $a$ of the common flue.

The sections $a$ shown in Figs. 1, 2, 3, 4, and 5 are represented as round, while in the modification shown in Figs. 6 and 7 the form in cross-section of the section $a$ shown may be described as spiral; but in both cases the bottom $c^2$ of the inlet is substantially at a tangent to the curve of the bottom of the section.

In the modification represented in Fig. 10, the section $a$ shown being octagonal in cross-section and there being, strictly speaking, no curve, the bottom of the inlet discharging into it is, strictly speaking, not tangential in form, but it is tangential in substance, and the apparatus operates upon the same principle as the other forms shown, though less perfectly. The essential feature so far as this portion of the improvement is concerned is that the inlet shall discharge the outer portion of the admitted current of air and lint against a curved or slanting surface adapted to deflect the current and assist in causing it to take up a whirling motion around the axis of the flue; and I include all such constructions within my meaning where I speak of the inlet as "tangential."

In the preferred form of my apparatus the expansion of the sections $a$ and the forward inclination given the axis of the inlets both tend to give the current of lint-bearing air a forward motion in the flue, so that upon being discharged into the flue the air flows forward along a spiral path and is caused by centrifugal force to follow the walls of the flue in its course until it reaches the inlet, if any, next in front of the one through which it has entered. Between the foremost section $a$ and the mouth $a^2$ the flue is preferably of the same cross-sectional area throughout as the front end of the section $a^2$ nearest the mouth, and this portion of the flue preferably makes an upward bend at $a^3$ and slants up toward the condenser D, hereinafter described, substantially as shown. The slanting portion $a^4$ is preferably provided with an opening $a^5$ through its bottom for the escape of dust, Figs. 8 and 9, and this opening is preferably surrounded by an outwardly-extending casing $a^6$. A removable dust-box E is shown surrounded by said casing $a^6$. To the bottom $e$ of this box one or more partitions $e'$ are preferably fastened so as to interfere with the longitudinal passage of air-currents in the box and also support the top $e^2$. The top $e^2$ is a screen designed to allow dust and dirt to pass through it and prevent the passage of cotton. It may be formed of perforated metal or its equivalents. The partitions $e'$ are held apart by side pieces $e^3$, which preferably do not extend to the bottom. I preferably leave opening $e^4$ between them and the bottom of the box for the escape of dust when the box is being emptied. The box may be held in position by hooks $e^5$, secured to the flange $a^6$ and passing around pins $e^6$, driven into the edge of the bottom $e$ of said box E, Figs. 1, 8, and 9, or by other suitable means.

The condenser D which I prefer to use has a casing $d$ with a curved top and a revoluble drum $d'$ arranged eccentrically within the casing nearer the doffing-rolls $d^2$ than the back of the casing and with a space $d^3$ above and behind it. In the back of the casing there is an opening $d^4$ for the admission of air and lint. It preferably extends substantially across the condenser from end to end. It is shown oval in form; but that shape, though a good one, is not material.

The body of the flue A is connected with the casing $d$ by means of the flaring mouth $a^2$, Figs. 1 and 2, whose lips preferably surround the opening $d^4$.

The apparatus shown operates substantially as follows: The gins being set in motion and supplied with seed-cotton, remove the lint from the seed and blow it into the flue A through the inlets C. Each of the currents of lint-bearing air received by the flue A takes up upon entering it a spiral course forward and each tends to follow the walls of the flue and create a partial vacuum along the axis of the flue. In consequence of this each current upon entering the flue takes up its course without mixing to any great extent with the currents received farther to the rear, and instead of opposing the forward movement of air admitted farther back tends to draw it forward into the central space around which the freshly-admitted current whirls. The lint, being heavier than the air, tends to fly outward and flow forward close to the walls of the flue, and the spiral movement of the air by causing the lint to be driven against the walls of the flue, beats the adhering dust and dirt out of it to a great extent before it reaches the condenser, and this dust and fine dirt passes forward with the air and lint until it reaches the dust-box E, where a large proportion enters said box and is in that way entirely separated from the lint. The whirling motion given the cotton tends to cause it to spread out as soon as the enlargement of the mouth $a^2$ permits it to do so, and also tends to cause it to spread in the same way upon entering the space $d^3$ above and back of the drum $d'$. This causes it to be deposited upon the drum $d'$ in the apparatus shown more evenly than heretofore and thus increases the uniformity of the bat formed, and the increase in the uniformity of the bat tends to make it possible to form a more perfect bale. In the form of apparatus shown the lint is deposited upon the top and front of the condenser-drum instead of being deposited against the back thereof in the usual way. The air and most of the dust remaining suspended therein enter the drum $d'$ in the usual manner and escape through the dust-pipes $d^4$.

I do not wish my claims to be understood as confining me to the special forms of mechanism shown. As will be obvious, the forms shown may be varied in many ways without departing from the principles of my improvements.

The form of the outside of the flue A, for instance, though shown round, is immaterial, and where in my claims I give its form I wish to be understood as referring only to the form of the passage through it.

Where in my claims I speak of "sections" I mean parts, and not parts made of one piece of material. The number of pieces used is immaterial.

I claim—

1. The combination of a cotton-condenser; a cotton-flue substantially curved in cross-section on the inside, and a tangential inlet.

2. The combination of a cotton-flue substantially curved in cross-section on the inside, and a tangential inlet whose axis inclines forward.

3. The combination of a cotton-flue substantially curved in cross-section on the inside and a tangential inlet.

4. The combination of a cotton-flue substantially curved in cross-section on the inside, and a tangential inlet at which said flue enlarges from rear to front.

5. The combination of a cotton-flue substantially curved in cross-section on the inside, and an inlet for a lint-bearing current of air; said flue enlarging from rear to front and the inlet being tangential, and having a forwardly-inclining axis.

6. The combination of a cotton-flue substantially curved in cross-section on the inside, and a tangential inlet having forwardly-inclined sides.

7. The combination of a common flue substantially curved in cross-section on the inside, and a series of tangential inlets.

8. The combination of a common flue substantially curved in cross-section on the inside, and a series of tangential inlets at each of which said flue enlarges.

9. The combination of a common flue substantially curved in cross-section on the inside and a series of tangential inlets each having a forwardly-inclined axis, and at each of which inlets said flue enlarges from rear to front.

10. The combination of a cotton-flue substantially curved in cross-section on the inside, and a series of inlets, said inlets discharging into parts which enlarge from rear to front and there being in said flue between each pair of enlarging parts, a part of substantially uniform diameter throughout its length.

11. The combination of a cotton-condenser; a cotton-flue substantially curved in cross-section on the inside, and having a laterally-flaring mouth, and a tangential inlet.

12. The combination of a series of machines for removing lint from cotton-seed; a condenser; a common flue, substantially curved in cross-section on the inside, discharging into the condenser; and means for connecting each of said machines for removing lint from seed, with said common flue, and for introducing a lint-bearing current of air from each of said machines into said flue tangentially.

13. The combination of a series of machines for removing lint from cotton-seed; a common flue substantially curved in cross-section on the inside; means for introducing tangentially from each of said machines a current of lint-bearing air into said flue, and causing it to assume on entering said flue a spiral course forward, means for the escape of dust from said flue; a condenser having a casing, and a condenser-drum arranged eccentrically in the casing nearer the front than the rear of the condenser, and with a space above it; and said flue discharging into the space between the condenser-drum and said casing, substantially as described.

JOHN R. FORDYCE.

Witnesses:
BENJ. F. REX,
EDWARD W. FURRELL.